(12) United States Patent
Lischynski et al.

(10) Patent No.: US 6,588,572 B2
(45) Date of Patent: Jul. 8, 2003

(54) GRANULAR MATERIAL TRANSFER CONVEYOR

(75) Inventors: Kimball Lischynski, Saskatoon (CA); Murray Kosokowsky, Pilger (CA)

(73) Assignee: Highline Mfg. Inc. (CA)

( * ) Notice: Subject to any disclaimer, the term of this patent is extended or adjusted under 35 U.S.C. 154(b) by 39 days.

(21) Appl. No.: 09/961,604

(22) Filed: Sep. 24, 2001

(65) Prior Publication Data

US 2002/0195310 A1 Dec. 26, 2002

Related U.S. Application Data

(63) Continuation-in-part of application No. 09/885,179, filed on Jun. 20, 2001, now abandoned.

(51) Int. Cl.$^7$ ............................................. B65G 21/10
(52) U.S. Cl. ........................ 198/317; 198/302; 198/303
(58) Field of Search ............................... 198/300, 302, 198/303, 311, 314, 317

(56) References Cited

U.S. PATENT DOCUMENTS

| | | | | |
|---|---|---|---|---|
| 2,856,062 A | * | 10/1958 | Kling | 198/302 X |
| 3,974,908 A | | 8/1976 | Keichinger | 198/93 |
| 4,058,198 A | * | 11/1977 | O'Neill et al. | 198/317 X |
| 4,265,429 A | * | 5/1981 | Formhals | 198/302 X |
| 4,526,265 A | | 7/1985 | Enns | 198/318 |
| 5,184,715 A | * | 2/1993 | Feterl | 198/311 X |
| 5,318,444 A | * | 6/1994 | Kuzub et al. | 198/302 X |
| 5,377,810 A | * | 1/1995 | Lehtonen et al. | 198/303 |
| 5,788,055 A | | 8/1998 | Stewart et al. | 198/671 |
| 6,068,103 A | | 5/2000 | Werner | 198/311 |

FOREIGN PATENT DOCUMENTS

CA 2196475 1/1997

* cited by examiner

*Primary Examiner*—James R. Bidwell
(74) *Attorney, Agent, or Firm*—Michael Best & Friedrich LLP

(57) ABSTRACT

A novel transfer conveyor transports material from a feed point to an input section of a main conveyor. The transfer conveyor comprises a feed end, a discharge end, and a conveyance device for conveying material from the feed end to the discharge end. A connector is provided for detachably and rotatably connecting the transfer conveyor to the main conveyor such that the feed end of the transfer conveyor may be moved about the input section of the main conveyor while maintaining a gravity assisted flow of material from the discharge end of the transfer conveyor into an input section of the main conveyor. The connector may be adapted to permit rotation of the transfer conveyor about the input section of the main conveyor at each operation angle of the main conveyor.

21 Claims, 13 Drawing Sheets

GRANULAR MATERIAL TRANSFER CONVEYOR

This application is a continuation-in-part of U.S. application Ser. No. 09/885,179 filed on Jun. 20, 2001, now abandoned.

FIELD OF INVENTION

The invention relates to an improved apparatus for conveying granular material to the input section of a main conveyor.

BACKGROUND

It is known to use transfer conveyors to convey granular material from a remote location to the input section of a main conveyor. Transfer conveyors are typically shorter than main conveyors and are often adapted to reach under bottom dumping bins or trucks.

Freestanding transfer conveyors are known. Such conveyors are generally manually positioned such that the input section is placed in the desired location and the output is positioned such that granular material discharged therefrom is deposited into a desired location, i.e. the input section of a main conveyor. It is known to provide such conveyors with wheels to facilitate movement. However, when entirely disconnected from the main conveyor, difficulty may be encountered in positioning freestanding transfer conveyors to ensure the material is discharged into the main conveyor without spillage. Further, such conveyors may not be easy to rotate about the input section of the main conveyor without disrupting alignment between the discharge section of the transfer conveyor and the input section of the main conveyor.

It is also known to permanently attach transfer conveyors to main conveyors. Typically, such transfer conveyors will have an operating position where granular material discharged from the transfer conveyor is deposited into the input section of the main conveyor and a transport position wherein the transfer conveyor is positioned along the main conveyor. One such conveyor is shown in Canadian Patent No. 2,196,475 which discloses a transfer conveyor connected to a main conveyor by means of a connection assembly mounted on a track positioned above the main conveyor. The connection assembly permits rotation of the transfer conveyor about the input section of the main conveyor when in operation. However, the transfer conveyor cannot easily be disconnected from the main conveyor for operation in a freestanding position.

SUMMARY OF INVENTION

It is an object of the invention to provide an improved transfer conveyor. According to a broad aspect of the invention, the invention provides a transfer conveyor for transporting material from a feed point to an input section of a main conveyor, said transfer conveyor comprising a feed end; a discharge end; a means for conveying material from the feed end to the discharge end; and a connector for detachably and rotatably connecting the transfer conveyor to the main conveyor such that the feed end of the transfer conveyor may be moved about input section of the main conveyor while maintaining the flow of the material from the discharge end of the transfer conveyor into an input section of the main conveyor.

According to another aspect of the invention, the transfer conveyor includes a nozzle portion mounted on the discharge end thereof and the connector comprises a male member mounted to the nozzle portion and a female member mounted within the input section of the main conveyor, the female member adapted to releasably receive the male member. Additionally, the connector is adaptable such that, at each operation angle of the main conveyor, the feed end of the transfer conveyor may be moved about the input section of the main conveyor while maintaining the flow of the material from the discharge end of the transfer conveyor into an input section of the main conveyor.

According to yet another aspect of the invention, the transfer conveyor is provided with an undercarriage that is moveable between a compact storage position and a support position wherein the discharge end of the transfer conveyor is positioned at an elevated position relative to the feed end such that the transfer conveyor is operable as a stand-alone conveyor.

According to final another aspect of the invention, the transfer conveyor includes transfer connectors for mounting the transfer conveyor on the main conveyor in a transport position wherein the transfer conveyor is mounted under the main conveyor.

The invention provides an improved transfer conveyor that can be connected to the input section of a main conveyor such that material discharged from the transfer conveyor is deposited into the input section of the main conveyor. The connection between the main conveyor and the transfer conveyor permits the transfer conveyor to be rotated about the input section of the main conveyor without disrupting the alignment between the transfer conveyor output and the main conveyor input. Furthermore, the transfer conveyor can be disconnected from the main conveyor and operated in a freestanding position. Moreover, the transfer conveyor can be mounted on the main conveyor for transport.

BRIEF DESCRIPTION OF THE DRAWINGS

Preferred embodiments of the invention will now be described by way of example with reference to the attached drawings in which.

DETAILED DESCRIPTION OF PREFERRED EMBODIMENTS

Figure 1:
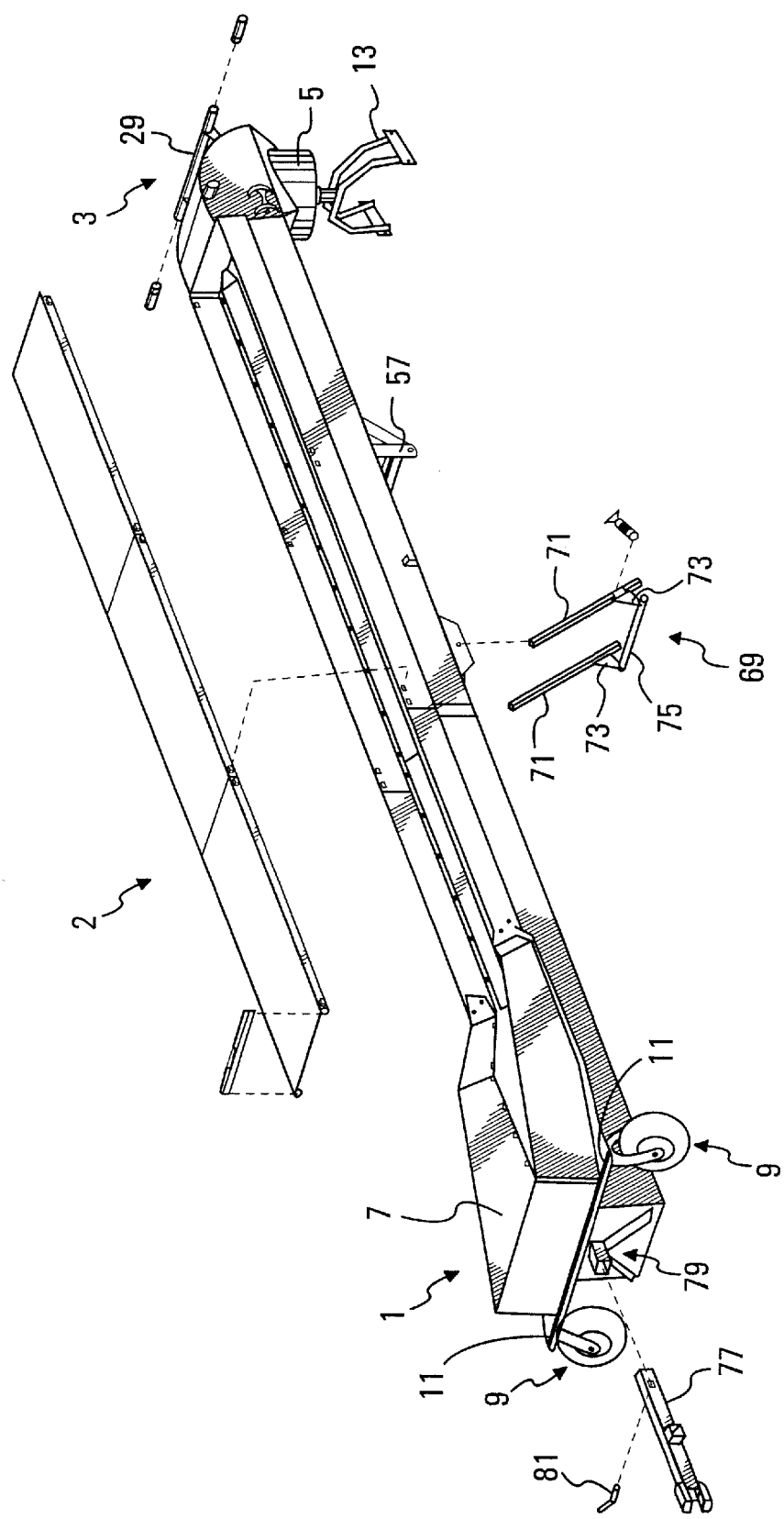
FIG. 1 is partially exploded perspective view of a transfer conveyor according to an embodiment of the invention.
Figure 2:
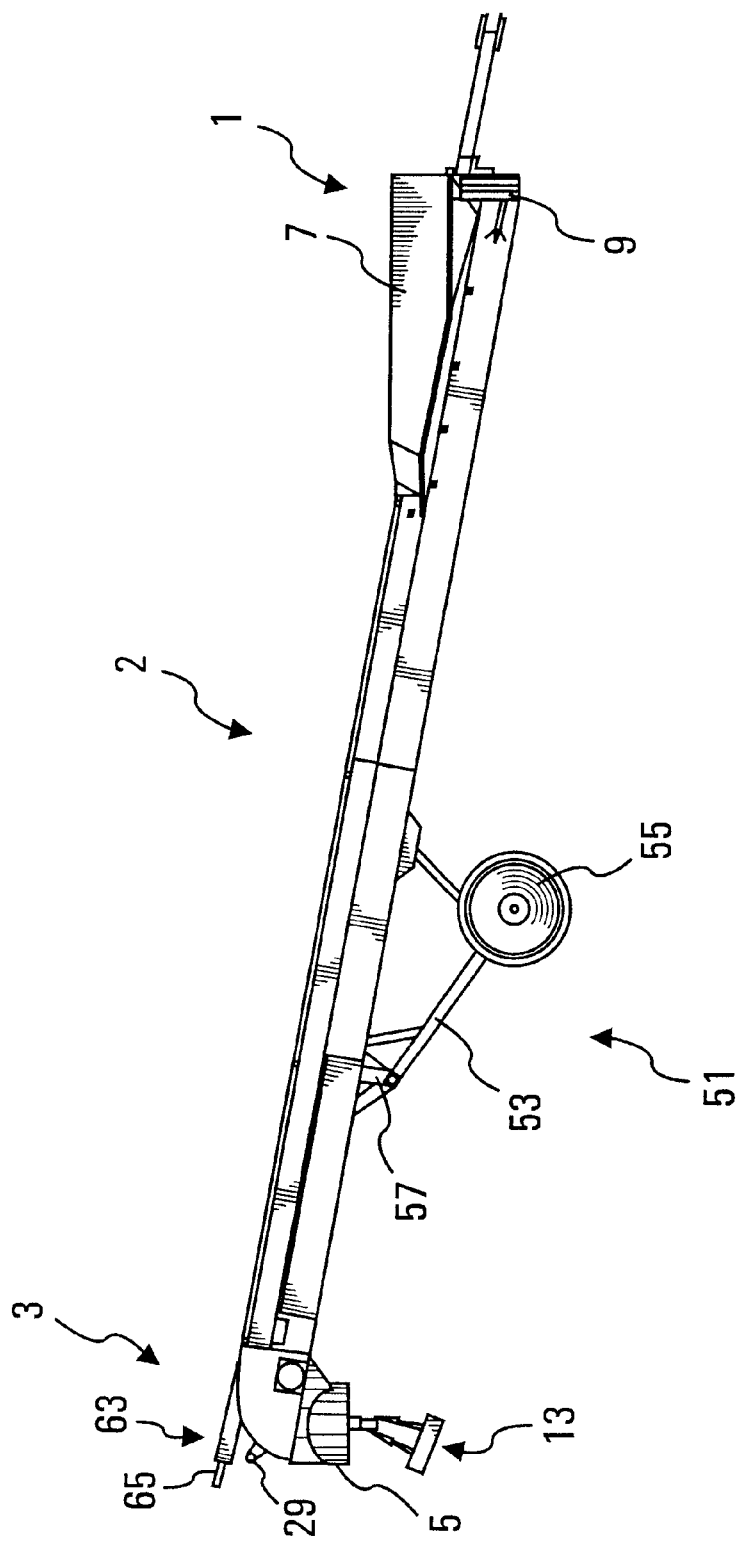
FIG. 2 is a right side view of a transfer conveyor according to an embodiment of the invention.

FIGS. 1 and 2 show a transfer conveyor 2 according to one embodiment of the invention, The transfer conveyor 2 as a feed section 1 and a discharge section 3 with a nozzle 5 A hopper 7 is mounted on the feed section 1 and is adapted to receive granular material from a feed source, such as a truck or hopper, and to direct the granular material onto a conveyance device. The granular material is the conveyed to the discharge section 3 and discharged out of nozzle 5.

Figure 3:
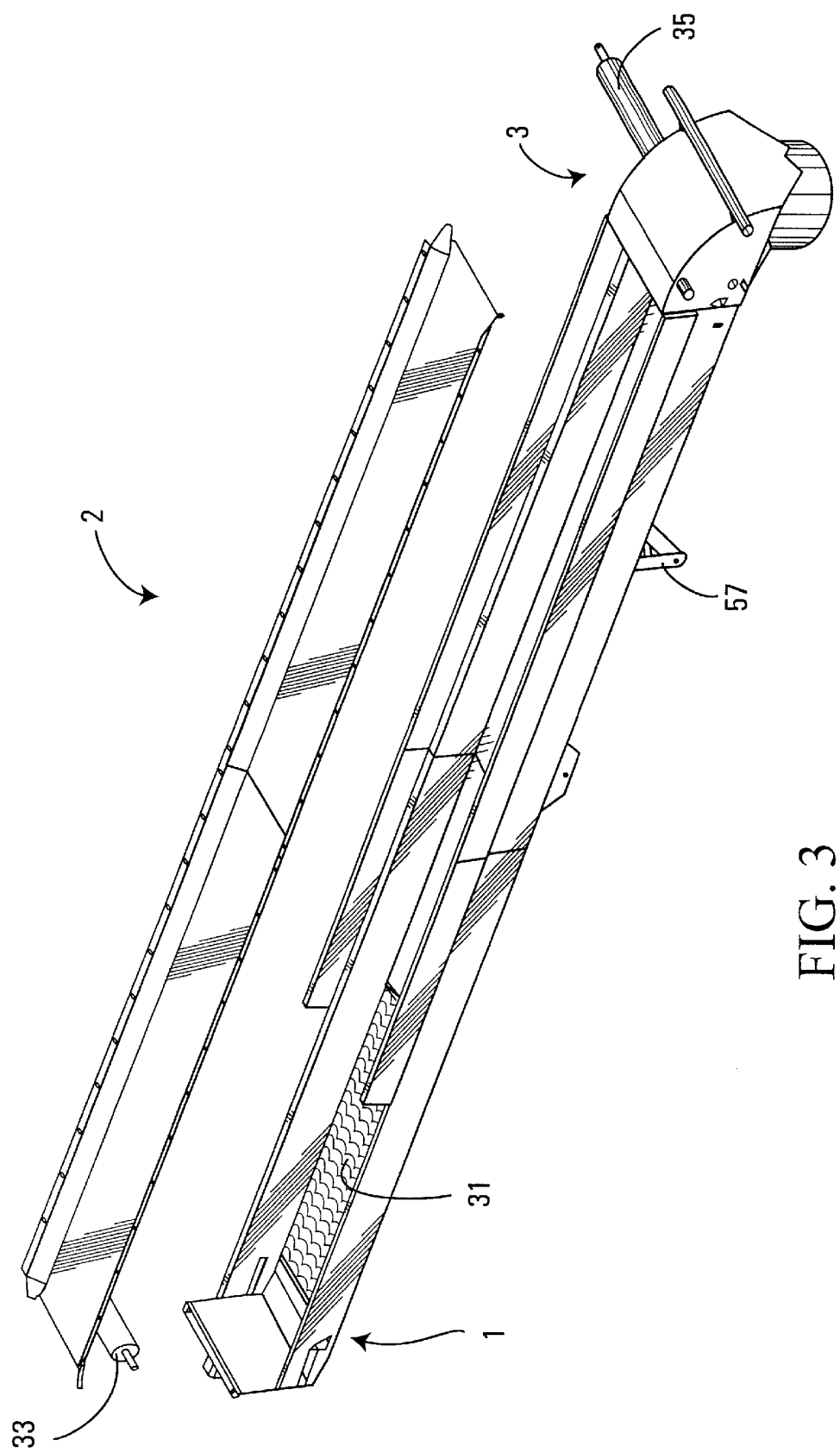
FIG. 3 is a partially exploded perspective view of a transfer conveyor according to an embodiment of the invention.

In the embodiment shown in the drawings, as can be seen in FIG. 3, the conveyance device comprises a conventional conveyor belt 31 mounted in the transfer conveyor 2 and adapted to transport granular material from the feed section 1 to the discharge section 3. The belt runs between two rollers 33 and 35 mounted within the transfer conveyor 2 at opposite ends thereof. The belt conveyor is driven by a motor 37 as shown in FIG. 4.

Figure 4:
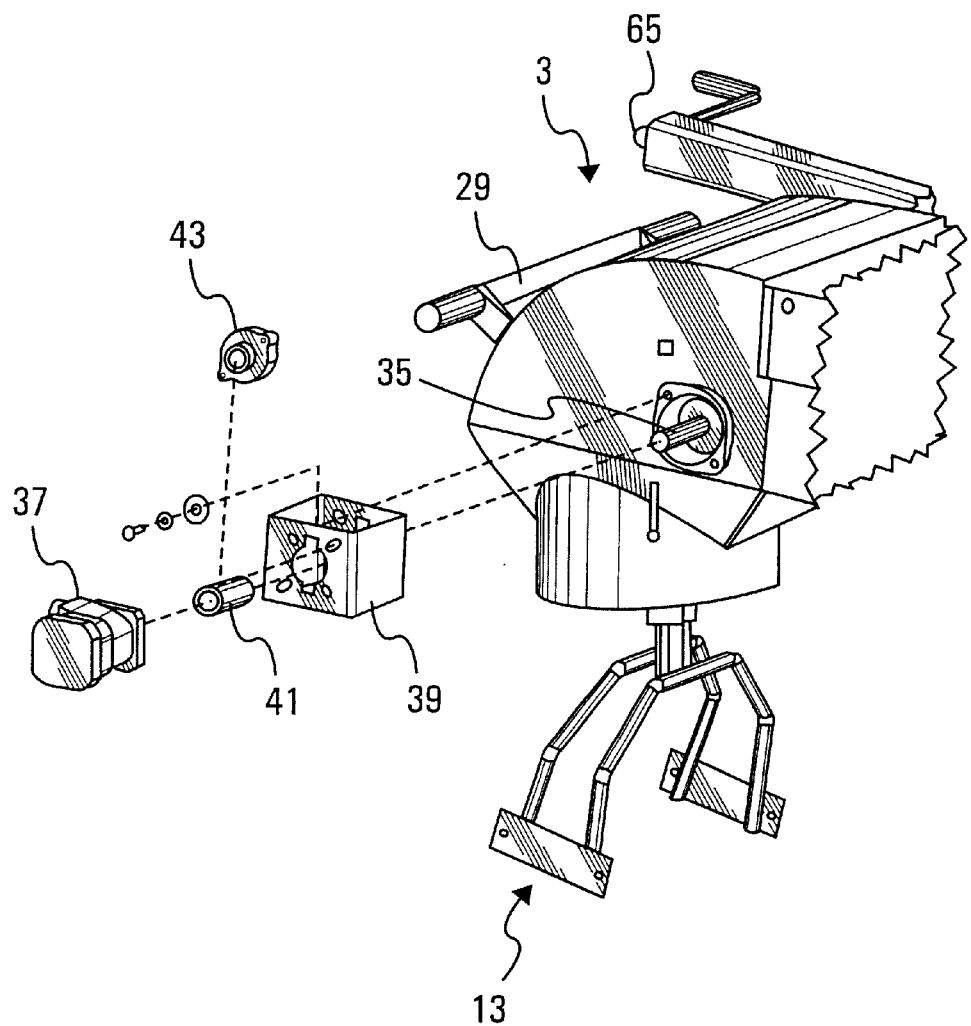
FIG. 4 is an exploded perspective view of a belt drive system according to an embodiment of the invention

In the embodiment shown in FIG. 4, a hydraulic motor 37 is used to drive roller 35 and thus, drive conveyor belt 31. However, it will be understood that any conventional motor or other power source may be used. The motor 37 is connected to the discharge section 3 of the transfer conveyor 2 by a motor mount 39. The motor 37 is attached to roller 35 by a coupler 41 that transfers the rotation of the motor 37 to the roller 35. A bearing 43 is mounted within the motor mount 39 to provide support to the roller 35 while permitting rotation thereof. It will be understood that any other conventional mounting means may be used to attach the motor or other power source.

Although the drawings show a specific embodiment of the conveyance device, it will be understood that alternative embodiments of the conveyance device may be used without departing from the invention in its broadest aspect. For example, the motor 37 could be arranged to drive roller 33 instead of roller 35. Alternatively, the motor 37 could be replaced by a belt or gear driving arrangement. Furthermore, an alternative type of conveyor device such as a screw type conveyor or a belt and screw conveyor combination may be used.

As illustrated in FIG. 1, wheels 9 are mounted to the feed end 1 of the transfer conveyor 2 by a mounting assembly 11 such that the wheels caster about an axis substantially perpendicular to the ground. The rotation of the wheels 9 in this manner facilitates movement of the feed end 1 of the transfer conveyor 2 in any direction as the wheels 9 will caster into a position parallel to the direction of travel of the feed end.

Figure 5:
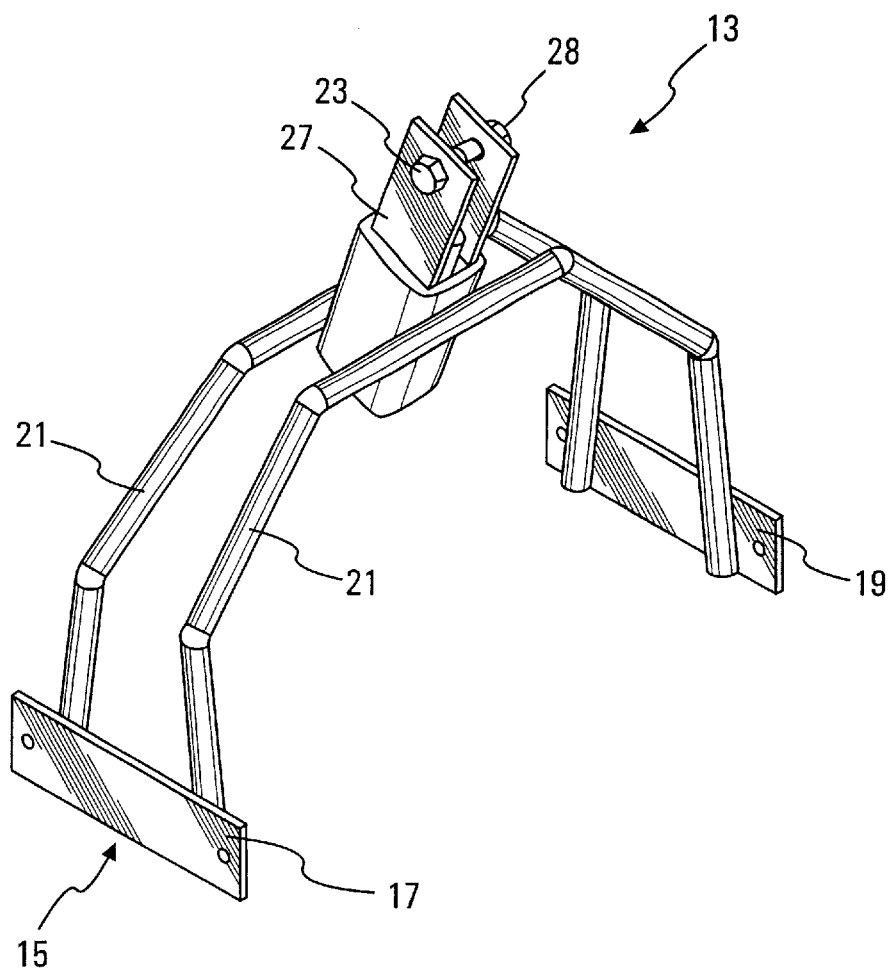
FIG. 5 is a perspective view of a connection assembly according to an embodiment of the invention.
Figure 6:
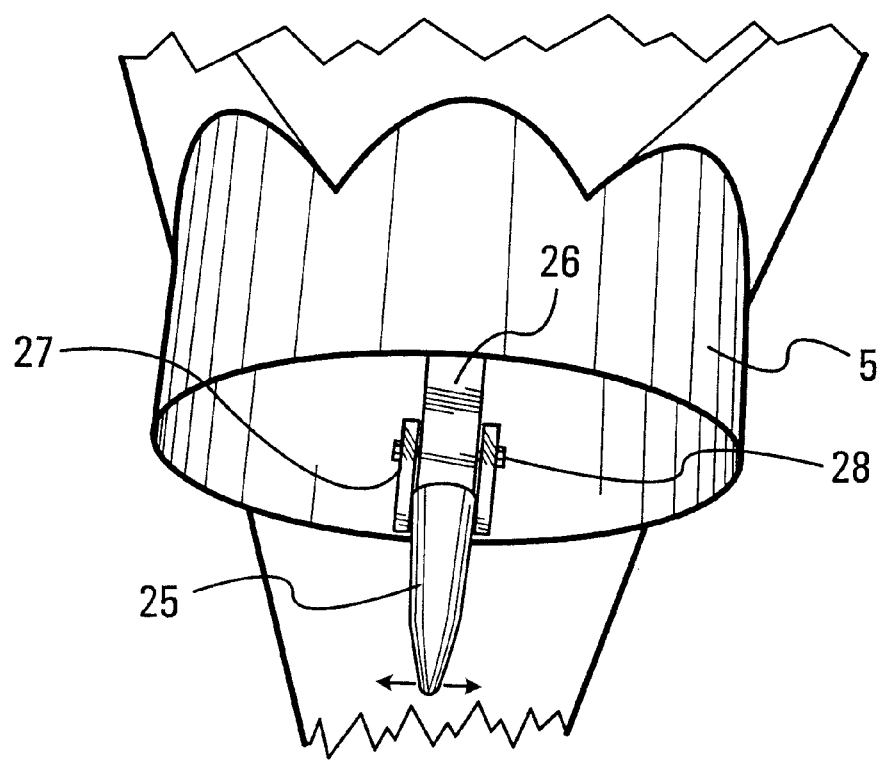
FIG. 6 is a perspective front view of the nozzle of the transfer conveyor disengaged from the connection assembly according to an embodiment of the invention.
Figure 7:
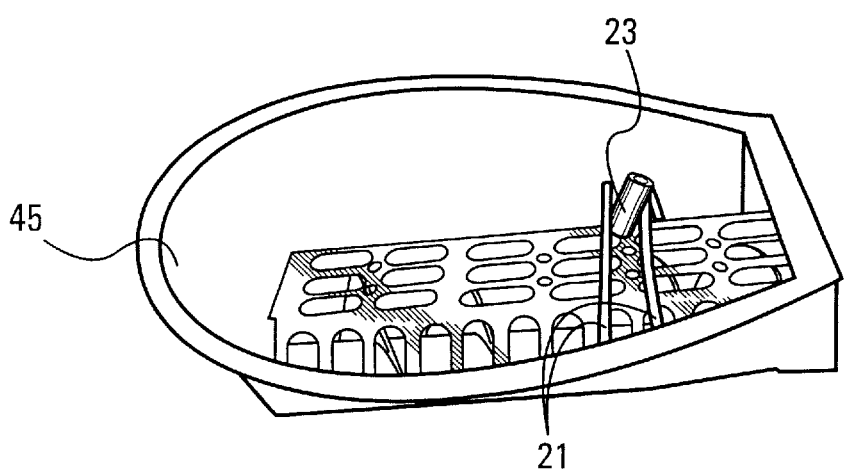
FIG. 7 is a perspective side view of the input section of a main conveyor with the connection assembly mounted therein according to an embodiment of the invention.

As illustrated in FIGS. 5 to 7, the nozzle 5 is provided with a connection assembly 13 for connecting the discharge end 3 of the transfer conveyor 2 to an input section of a main conveyor 45. The connection assembly 13 includes a bracket member 15 which is mounted within the input section of the main conveyor 45, as shown in FIG. 7, by a set of bracket plates 17 and 19 positioned at opposing ends thereof. A set of arms 21 extend in an arc shaped configuration between the bracket plates 17 and 19. A bushing 23 is mounted between the bracket arms 21 at the apex of the arc shaped configuration. The bushing 23 is mounted such that its longitudinal axis is set at an angle relative to the bracket member 15. Further details regarding the selection of the angle of the bushing 23 will be discussed in greater detail below. The bracket member 15 is also positioned in close proximity to the front end of the input section of the main conveyor 45 to avoid a build up of granular material in the input section during operation.

Figure 11:
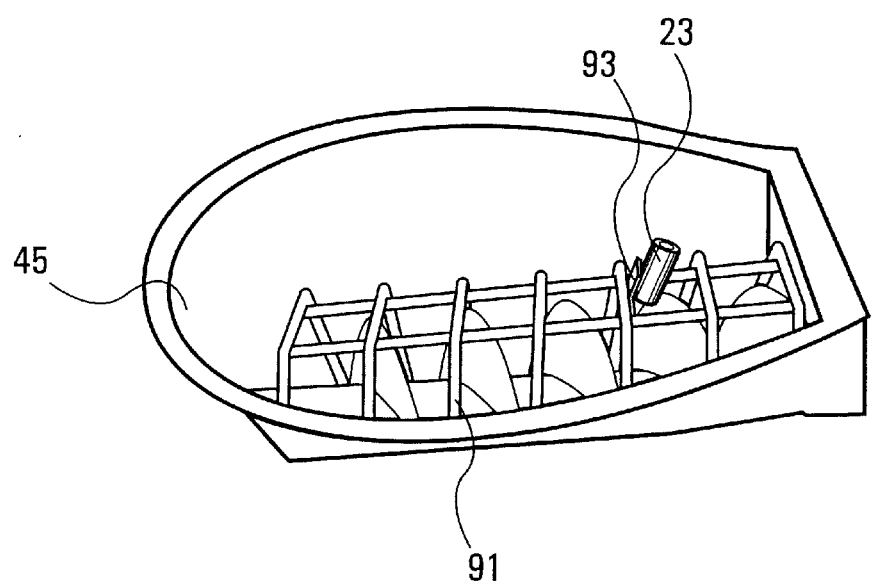
FIG. 11 is a perspective side view of the input section of a main conveyor with the connection assembly mounted therein according to a further embodiment of the invention.

It would be understood that alternative methods of mounting the bushing 23 in the input section of the main conveyor 45 could be used without departing from the object of this invention in its broadest aspect. For example, as shown in FIG. 11, the bushing 23 can be mounted to a protective grating 91 within the input section of the main conveyor 45 by a bracket assembly 93. The bracket assembly 93 is designed such that the longitudinal axis of bushing 23 is mounted at the appropriate angle as will be discussed in further detail below.

Figure 13:
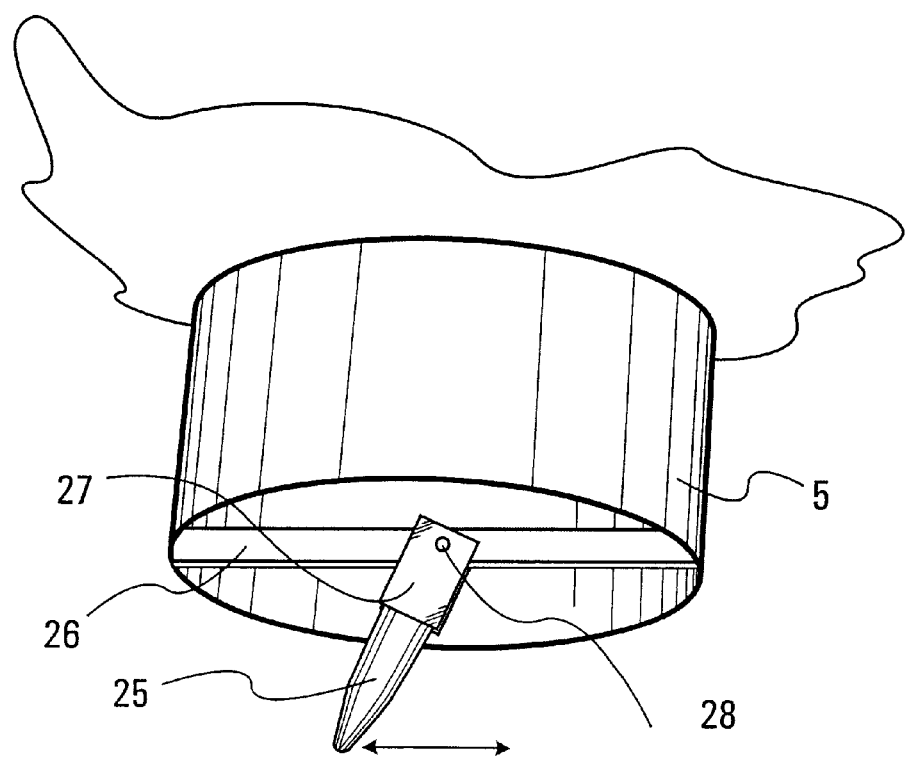
FIG. 13 is a perspective side view of the nozzle of the transfer conveyor shown in FIG. 6 according to an embodiment of the invention.

As illustrated in FIGS. 6 and 13, the nozzle 5 is provided with a pin member 25 mounted in the center thereof by a clevis connection 27 which is secured by a bolt 28 to a cross brace 26 extending across the center of nozzle 5. The cross brace 26 extends longitudinally across the nozzle 5 to avoid a build up of granular material in the nozzle during operation. The pin member 25 is sized to be detachably inserted within the bushing 23 while permitting rotation thereof within the bushing. Accordingly, the connection assembly supports the discharge end 3 of the transfer conveyor 2 while permitting rotation of the feed end 1 of the transfer conveyor 2 about the input section of the main conveyor 45 without disrupting the alignment of the nozzle 5 with the input section of the main conveyor.

The transfer conveyor 2 is disconnected from the input end of the main conveyor by lifting the discharge end 3 thereby removing the pin member 25 from the bushing 23.

The main conveyor to which the transfer conveyor is connected is often operated within a predetermined range of operation angles (typically approximately 10° to 30°). Accordingly, the height and orientation of the bushing 23 will vary as the operation angle of the main conveyor is varied, thereby varying the operation angle of the transfer conveyor. As such, the connection assembly 13 is adjustable to permit rotation of the transfer conveyor 2 about the input section of the main conveyor 45 through the range of operation angles of the main conveyor.

In the embodiment shown in FIGS. 6 and 13, the adjustability of the connection assembly 13 is provided by the clevis connection 27 which permits limited radial displacement of the free end of the pin member 25. As illustrated in FIG. 13, radial movement of the free end of the pin member 25 in a direction parallel to the cross brace is provided by rotation of the pin member about the bolt 28.

The degree of movement in this direction is restricted by abutment of the top portion of pin 25 (contained within the clevis connection 27) with the cross brace 26. As shown in FIG. 6, the holes provided in the clevis connection 27 and the cross brace 26 through which the bolt 28 is inserted are oversized thereby permitting limited radial displacement of the free end of pin member 25 in the direction transverse to the cross brace 26. Accordingly, this configuration operates as a limited universal joint permitting limited radial displacement of the free end of the pin member 25 through a range of 360 degrees.

The amount of radial displacement of the free end of pin member 25 required for a particular transfer conveyor and main conveyor combination will depend upon a number of factors including the range of operation angles of the main conveyor, the positioning of the bushing on the main conveyor and the length of the transfer conveyor. For any given arrangement, the amount of radial displacement required is minimized by orienting the cross brace 26 in the nozzle 5 of the transfer conveyor 2 and the bushing 23 such that, when the operation angle of the main conveyor is at the mid-point of the range of operation angles, the longitudinal axis of the bushing 23 is vertical and the free end of pin member 25 is centered within its range of radial displacement when inserted into bushing 23.

Figure 8:
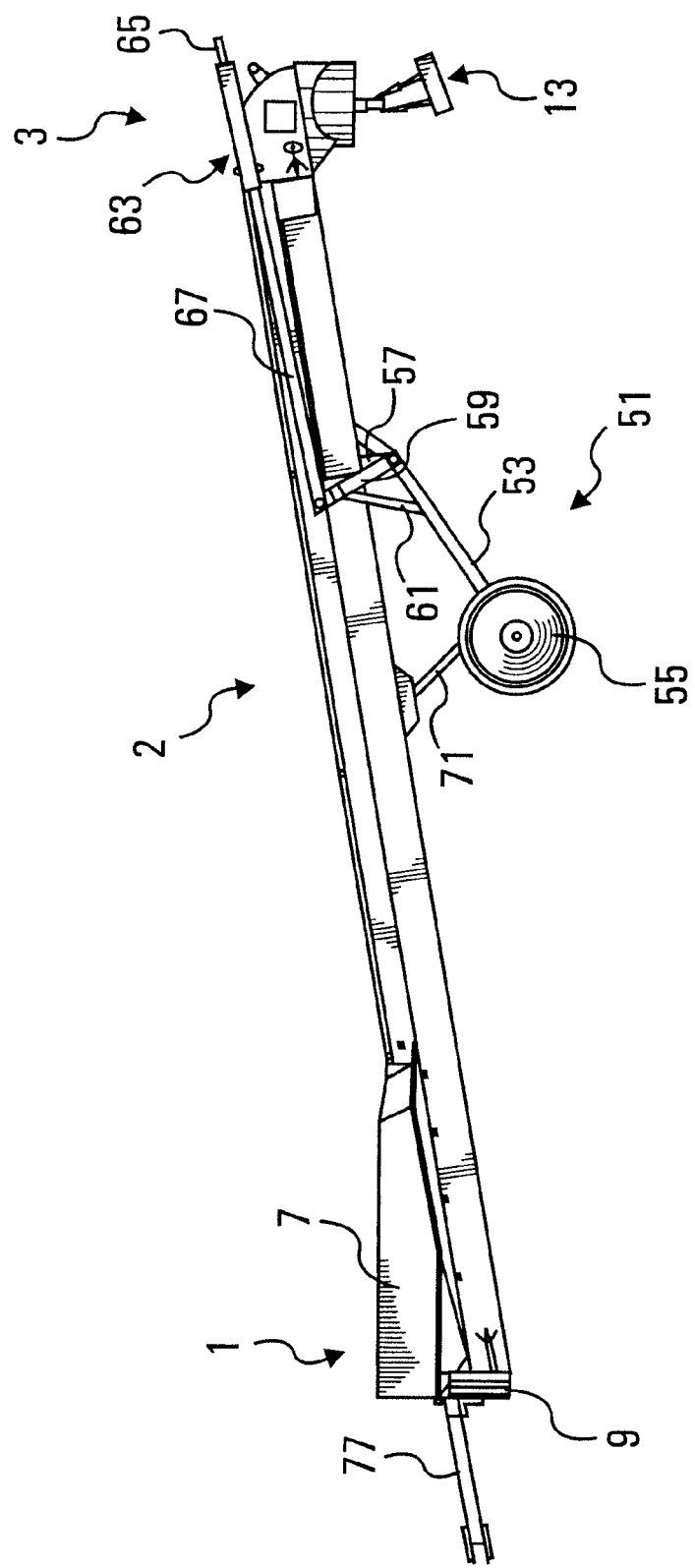
FIG. 8 is a left side view of a transfer conveyor according to an embodiment of the invention.
Figure 10:
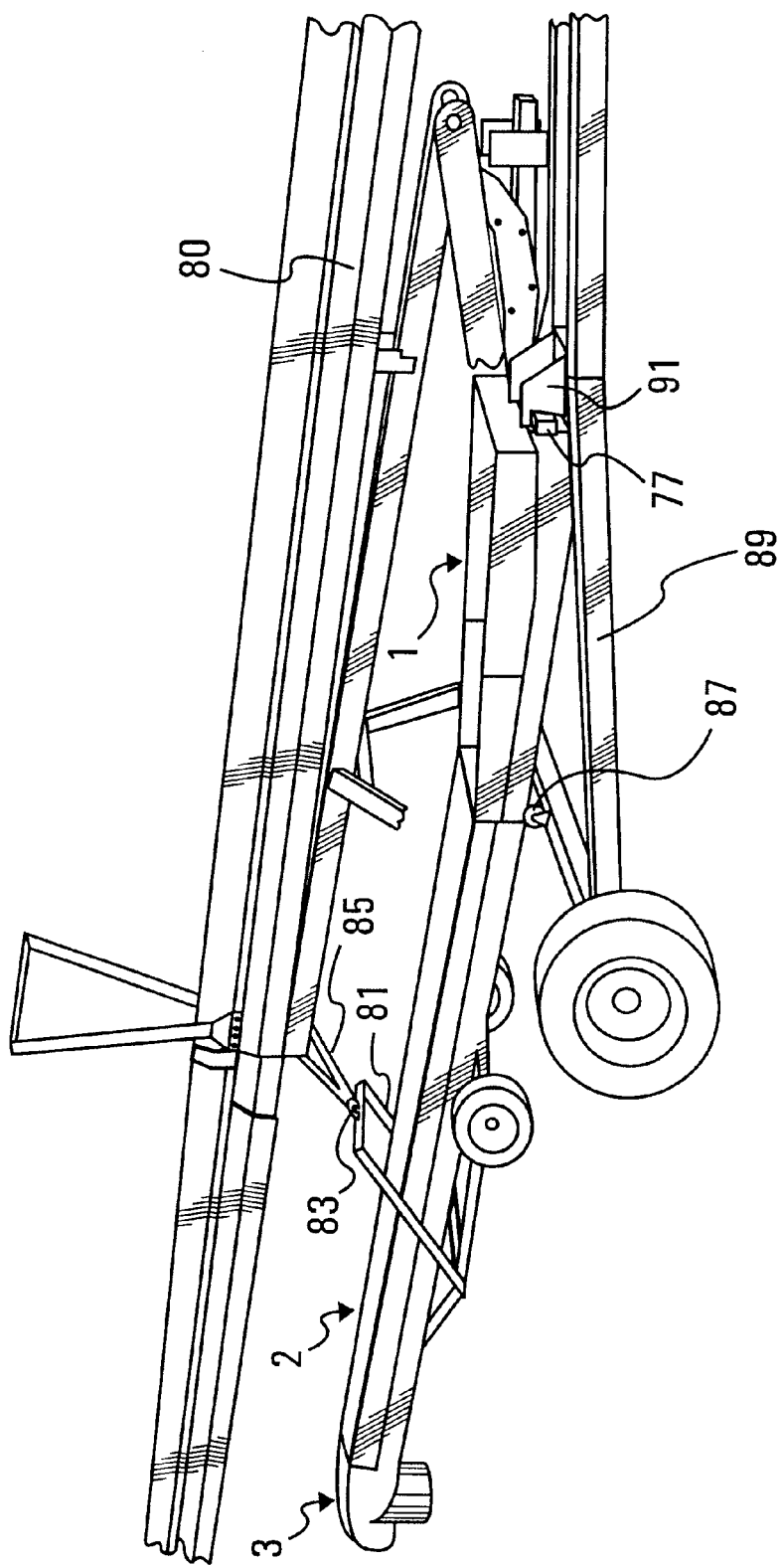
FIG. 10 is a perspective side view of a transfer conveyor according to an embodiment of the invention mounted in the transport position under a main conveyor.

As shown in FIGS. 2 and 8, the transfer conveyor 2 is also provided with a retractable support assembly 51 to support the transfer conveyor when disconnected from the connection assembly 13 thereby permitting the transfer conveyor to be operated in a freestanding position. The retractable support assembly 51 is used to facilitate connection and disconnection of the support assembly 13 as well as mounting the transfer conveyor into a transport position under the main conveyor as shown in FIG. 10. Each of these operations will be discussed in greater detail below.

Figure 9:
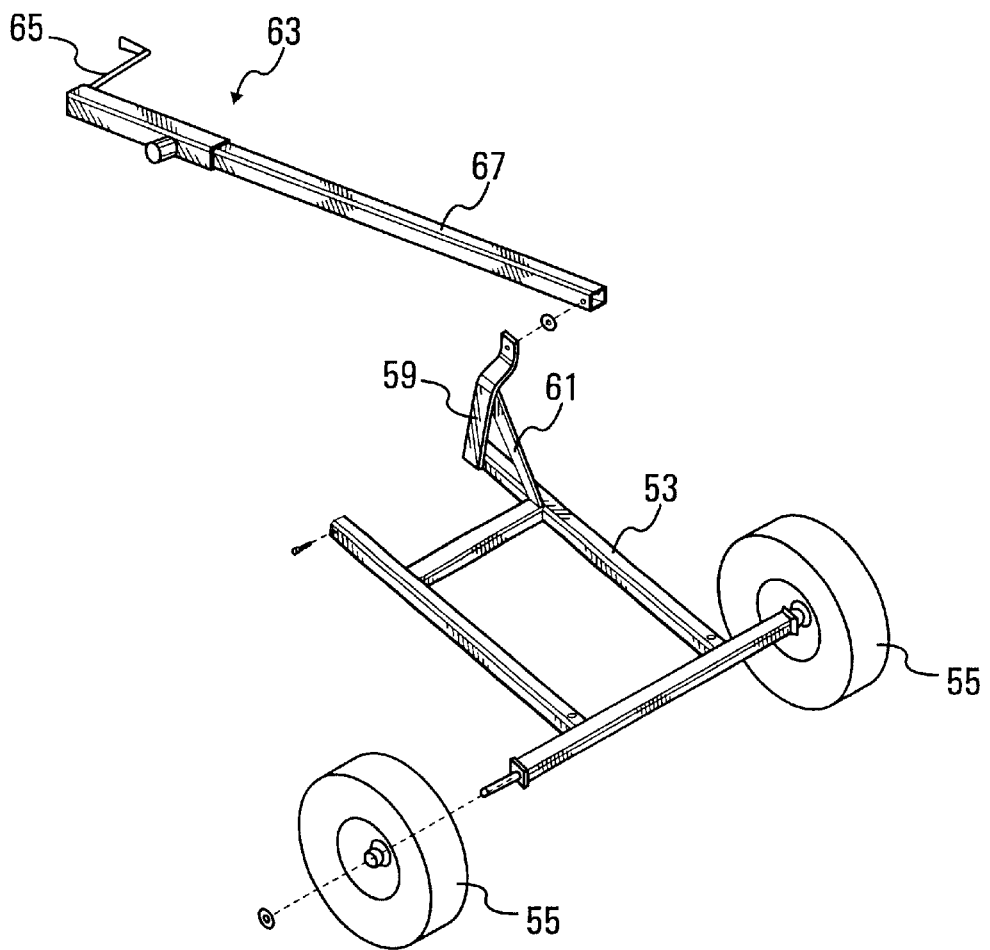
FIG. 9 is a perspective view of a support assembly according to an embodiment of the invention.

As best shown in FIGS. 8 and 9, the retractable support assembly 51 includes an undercarriage 53 with a set of wheels 55 mounted thereon. The undercarriage 53 is pivotally attached to pivot members 57 positioned on the underside of the transfer conveyor 2 by means of a nut and bolt arrangement or the like. An arm member 59 is mounted on the left side of the undercarriage 53 and extends up along the left side of the transfer conveyor. A support member 61 extends from the arm member 59 to the undercarriage 53 to maintain the arm member at the desired angle relative to the undercarriage 53.

The arm member 59 is also pivotally connected to a jack 63 mounted on the left side of the transfer conveyor 2. The jack 63 includes a handle 65 and a reciprocating member 67. Rotation of the handle 65 causes the reciprocating member 67 to extend or contract along the axis of the jack 63 thereby raising or lowering the undercarriage 53. The retractable support assembly 51 also includes a locking assembly 69 for supporting the undercarriage 53 when it is placed in a lowered position as shown in FIGS. 2 and 8. As shown in FIG. 1, the locking assembly 69 includes a set of locking arms 71 that have an end pivotally mounted to the underside of the transfer conveyor 2. The locking arms 71 each have a flange 73 extending at right angles therefrom with a handle 75 extending therefrom. As shown in FIGS. 2 and 8, when the undercarriage 53 is lowered, the locking assembly 69 pivots downwards where the locking arms 71 and flanges 73 engage the undercarriage. In this position, the locking assembly 69 assists in providing support for the undercarriage 53.

To move the undercarriage 53 into a compact storage position, the locking assembly 69 is raised toward the underside of the transfer conveyor 2 where it is locked into position by a suitable locking mechanism (not shown). Once the locking assembly 69 is raised, the jack 63 can be used to lift the undercarriage 53 towards the underside of the transfer conveyor 2 into a compact storage position. The jack 63 also serves to maintain the undercarriage 53 within the compact storage position.

In addition to supporting the transfer conveyor 2 when operating in a free standing position, the retractable support assembly 51 is used to connect and disconnect the connection assembly 13. The support assembly 51 can be raised and lowered by the jack 63 thereby moving the pin member 25 in and out of engagement with the bushing 23. The handle 65 extends from the discharge end 3 of the transfer conveyor 2 to facilitate viewing of the pin member 25 to ensure engagement into bushing 23 as the pin member 25 is lowered. The discharge end 3 is also provided with a handle 29 to facilitate movement of the discharge end to align the pin member 25 with the bushing 23.

As shown in FIG. 1, the transfer conveyor 2 is also provided with a hitch assembly 77 at the feed end 1. The hitch assembly 77 has a T-shaped configuration with the upper portion thereof having one end adapted to be inserted into a bracket 79 mounted on the feed end 1. A pin 81 is inserted into the bracket 79 to maintain the hitch therein. The opposing end of the upper portion of the hitch assembly 77 is provided with a hitch for connection to an appropriate transporting device such as a tractor. The base portion of the T-shaped hitch assembly 77 is substantially shorter than the upper portion thereof and has an end adapted to be inserted into the bracket 79. Thus, when not in use, the base portion of the hitch can be inserted into the bracket 79.

Figure 12:
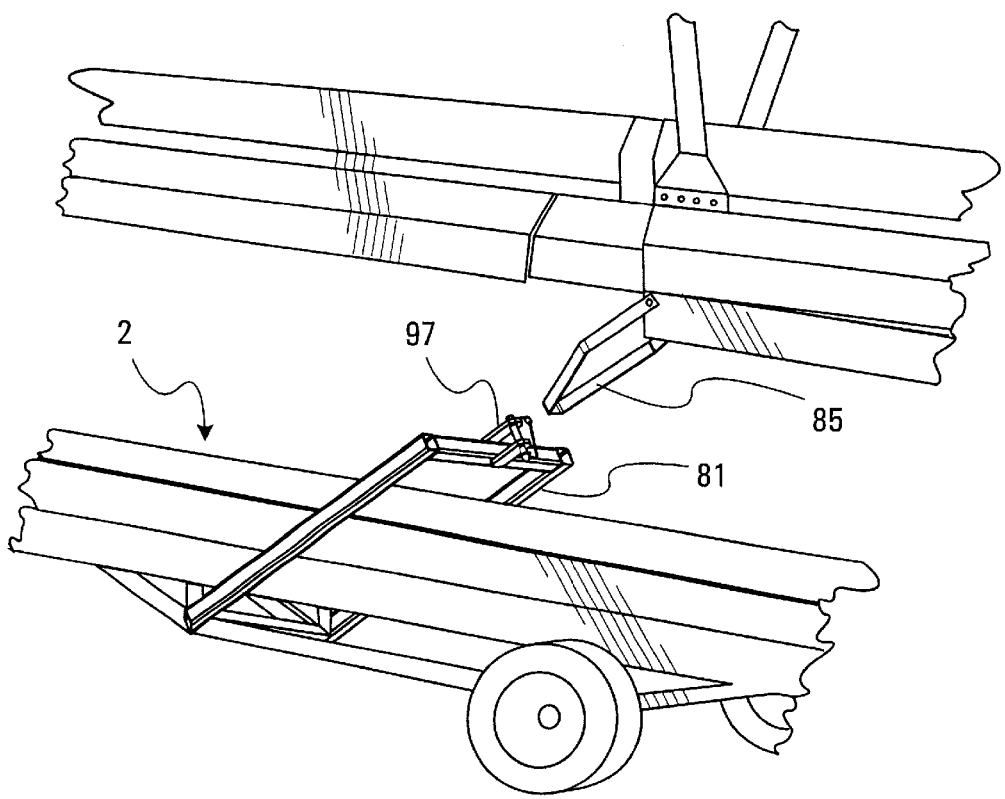
FIG. 12 is a perspective side view of a transfer conveyor according to a further embodiment of the invention mounted in the transport position under a main conveyor.

In an alternative to using the hitch assembly 77 for transport, the transfer conveyor 2 can be mounted underneath a main conveyor 80 for transport as shown in FIG. 10. A U-shaped assembly 81 is pivotally attached to the pivot members 57. The U-shaped assembly 81 includes a hook 83 which is attached to a bracket 85 mounted on the underside of the main conveyor 80. It would be understood that alternative connections could be used to suspend the transfer conveyor to underneath the main conveyor. For example, as shown in FIG. 12, a bolt and clevis connection 97 can be used in lieu of the hook 83 to secure the U-shaped assembly 81 to the bracket 85.

A roller 87 is mounted on the undercarriage 89 of the main conveyor 80. Positioned behind the roller 87 is a set of locking brackets 91 mounted on the undercarriage 89 which are adapted to receive the hitch assembly 77.

To mount the transfer conveyor 2 under the main conveyor 80, the hitch assembly 77 is placed with the short base portion inserted into the bracket 79. The retractable support assembly 51 is lowered to support the transfer conveyor 2. The feed section 1 is raised by pivoting the transfer conveyor 2 about the wheels 55 on the retractable support assembly 51 by application of a downward force on handle 29. The feed section 1 is then positioned on the roller 87 and the transfer conveyor 2 is pushed backwards along the undercarriage 89 of the main conveyor 80 until the hitch assembly 77 engages with the locking brackets 91. The maximum height of the retractable support assembly 51 is selected such that when the feed section 1 is positioned on the undercarriage 89, the discharge end 3 of the transfer conveyor 2 is elevated to a height that the hook 83 can be attached to bracket 85 without the need to lift the transfer conveyor by hand or other means. Once the transfer conveyor 2 is mounted underneath the main conveyor, the retractable support assembly 51 is raised by jack 63 into its compact storage position as described above.

It will be understood by those skilled in the art that numerous alterations, modifications and variations to the above embodiments can be made without departing from the invention as claimed.

We claim:

1. A transfer conveyor for transporting material from a feed point to an input section of a main conveyor having an undercarriage, said transfer conveyor comprising:
   (a) a feed end;
   (b) a discharge end provided with a nozzle portion;
   (c) a means for conveying material from the feed end to the discharge end; and (c) a connector comprising a male member and a female member adapted to releasably receive the male member for detachably and rotatably connecting the transfer conveyor to the main conveyor such that the feed end of the transfer conveyor may be moved about input section of the main conveyor while maintaining the flow of the material from the discharge end of the transfer conveyor into an input section of the main conveyor;

(d) at least one ground engaging caster wheel mounted at the feed end of the transfer conveyor;

(e) an undercarriage moveable between a compact storage position and a support position wherein the discharge end of the transfer conveyor is positioned at an elevated position relative to the feed end such that the transfer conveyor is operable as a stand-alone conveyor, the undercarriage including wheels which engage the ground when the undercarriage is in the support position;

(f) transfer connectors for mounting the transfer conveyor under the main conveyor in a transport position comprising:
  i) mounting means for securing the feed end of the transfer conveyor on the undercarriage of the main conveyor; and
  ii) a connecting member mounted to the transfer conveyor and having an end adapted to be connected to the main conveyor such that, when connected, the discharge end of the transfer conveyor is maintained at a position above the ground.

2. An apparatus as claimed in claim 1 wherein the main conveyor has a range of operation angles and the connector is adapted for detachably and rotatably connecting the transfer conveyor to the main conveyor such that, at each operation angle of the main conveyor, the feed end of the transfer conveyor may be moved about the input section of the main conveyor while maintaining the flow of the material from the discharge end of the transfer conveyor into an input section of the main conveyor.

3. A transfer conveyor for transporting material from a feed point to an input section of a main conveyor, said transfer conveyor comprising:
  (a) a feed end;
  (b) a discharge end;
  (c) a means for conveying material from the feed end to the discharge end; and
  (d) a connector for detachably and rotatably connecting the transfer conveyor to the main conveyor such that the feed end of the transfer conveyor may be moved about input section of the main conveyor while maintaining a gravity assisted flow of the material from the discharge end of the transfer conveyor into an input section of the main conveyor.

4. An apparatus as claimed in claim 3 wherein the connector comprises:
  (a) a male member; and
  (b) a female member adapted to releasably receive the male member.

5. An apparatus as claimed in claim 4 wherein the discharge end of the transfer conveyor includes a nozzle portion and the male member is mounted to the nozzle portion and the female member is mounted within the input section of the main conveyor.

6. An apparatus as claimed in claim 3 wherein the main conveyor has a range of operation angles and the connector is adapted for detachably and rotatably connecting the transfer conveyor to the main conveyor such that, at each operation angle of the main conveyor, the feed end of the transfer conveyor may be moved about the input section of the main conveyor while maintaining the flow of the material from the discharge end of the transfer conveyor into the input section of the main conveyor.

7. An apparatus as claimed in claim 6 wherein the discharge end of the transfer conveyor includes a nozzle portion and the connector comprises:
  (a) a male member mounted to the nozzle portion; and
  (b) a female member adapted to releasably receive the male member mounted within the input section of the main conveyor.

8. An apparatus as claimed in claim 7 wherein the male member comprises a pin having a free end and the female member comprises a bushing adapted to permit rotation of the pin within the bushing about its longitudinal axis.

9. An apparatus as claimed in claim 8 wherein the pin is mounted within the nozzle portion by mounting means adapted to permit limited radial displacement of the free end of the pin member.

10. An apparatus as claimed in claim 9 wherein the bushing is mounted within the input section of the main conveyor such that, when the main conveyor is at an operation angle at the mid-point of its range of operation angles, the longitudinal axis of the bushing is vertical.

11. An apparatus as claimed in claim 5 wherein the feed end of the transfer conveyor includes a ground engaging low friction support member to facilitate movement of the feed about the input section of the main conveyor.

12. An apparatus as claimed in claim 11 wherein the ground engaging low friction support member comprises at least one caster wheel mounted at the feed end of the transfer conveyor.

13. An apparatus as claimed in claim 5 further comprising an undercarriage adapted to support the transfer conveyor.

14. An apparatus as claimed in claim 13 wherein the undercarriage is moveable between a compact storage position and a support position wherein the discharge end of the transfer conveyor is positioned at an elevated position relative to the feed end such that the transfer conveyor is operable as a stand-alone conveyor.

15. An apparatus as claimed in claim 14 further comprising wheels on the undercarriage for engaging the ground when the undercarriage is in the support position.

16. An apparatus as claimed in claim 14 further comprising a jack assembly connected to the undercarriage for moving the undercarriage between the compact storage position and the support position.

17. An apparatus as claimed in claim 5 further comprising transfer connectors for mounting the transfer conveyor on the main conveyor in a transport position.

18. An apparatus as claimed in claim 17 wherein the transfer conveyor is mounted under the main conveyor when in the transport position.

19. An apparatus as claimed in claim 18 wherein the main conveyor has an undercarriage and the transfer connectors comprise:
  (a) mounting means for securing the feed end of the transfer conveyor on the undercarriage of the main conveyor; and
  (b) a connecting member mounted to the transfer conveyor and having an end adapted to be connected to the main conveyor such that, when connected, the discharge end of the transfer conveyor is maintained at a position above the ground.

20. A transfer conveyor for transporting material from a feed point to an input section of a main conveyor, said transfer conveyor comprising:

(a) a feed end;
(b) a discharge end including a nozzle portion;
(c) a means for conveying material from the feed end to the discharge end; and
(d) a connector for detachably and rotatably connecting the transfer conveyor to the main conveyor such that the feed end of the transfer conveyor may be moved about input section of the main conveyor while maintaining the flow of the material from the discharge end of the transfer conveyor into an input section of the main conveyor, the connector including:

a male member, mounted to the nozzle portion, including a pin mounted to the nozzle portion; and a female member, mounted within the input section of the main conveyor, adapted to releasably receive the male member, the female member including a bushing adapted to permit rotation of the pin within the bushing about its longitudinal axis.

21. An apparatus as claimed in claim 20 wherein the bushing is mounted within the input section of the main conveyor by a bracket.

* * * * *